United States Patent
Rychikhin

(10) Patent No.: US 10,482,135 B2
(45) Date of Patent: Nov. 19, 2019

(54) FACILITATING DYNAMIC GENERATION AND CUSTOMIZATION OF SOFTWARE APPLICATIONS AT CLIENT COMPUTING DEVICES USING SERVER METADATA IN AN ON-DEMAND SERVICES ENVIRONMENT

(71) Applicant: salesforce.com, inc., San Francisco, CA (US)

(72) Inventor: Yuri Rychikhin, Seattle, WA (US)

(73) Assignee: salesforce.com, inc., San Francisco, CA (US)

( * ) Notice: Subject to any disclaimer, the term of this patent is extended or adjusted under 35 U.S.C. 154(b) by 863 days.

(21) Appl. No.: 13/940,129

(22) Filed: Jul. 11, 2013

(65) Prior Publication Data

US 2014/0019480 A1    Jan. 16, 2014

Related U.S. Application Data

(60) Provisional application No. 61/670,702, filed on Jul. 12, 2012.

(51) Int. Cl.
| | | |
|---|---|---|
| *G06F 17/30* | (2006.01) | |
| *G06F 16/951* | (2019.01) | |
| *G06F 8/30* | (2018.01) | |
| *G06F 8/38* | (2018.01) | |

(52) U.S. Cl.
CPC .............. *G06F 16/951* (2019.01); *G06F 8/30* (2013.01); *G06F 8/38* (2013.01)

(58) Field of Classification Search
CPC ......... G06F 17/30864; G06F 8/30; G06F 8/38
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |

(Continued)

*Primary Examiner* — Mark D Featherstone
*Assistant Examiner* — Navneet Gmahl
(74) *Attorney, Agent, or Firm* — Jaffery, Watson, Mendonsa & Hamilton, LLP

(57) ABSTRACT

In accordance with embodiments, there are provided mechanisms and methods for facilitating dynamic generation and customization of software applications using server metadata in an on-demand services environment in a multi-tenant environment according to one embodiment. In one embodiment and by way of example, a method includes receiving, at a server computing device, a request to access server metadata relating to object types, where the server metadata is stored at a database coupled to the server computing device. The method may further include providing access to the server metadata, and facilitating, using the server metadata, dynamic generation of a mobile software application at a client computing device including a mobile computing device. The dynamic generation of the mobile software application is performed automatically, in runtime, and locally at the client computing device in response to the request.

20 Claims, 7 Drawing Sheets

(56) References Cited

U.S. PATENT DOCUMENTS

| | | | |
|---|---|---|---|
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,620,655 B2 | 11/2009 | Larsson et al. | |
| 8,554,836 B1 * | 10/2013 | Wilson | G06Q 30/0214 709/203 |
| 8,660,541 B1 * | 2/2014 | Beresniewicz | H04W 4/02 455/414.2 |
| 9,069,788 B2 * | 6/2015 | Dutta | G06F 17/30165 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0123409 A1 * | 6/2006 | Jordan, III | G06F 8/61 717/174 |
| 2009/0024609 A1 * | 1/2009 | Barker | G06F 17/30722 |
| 2009/0030885 A1 * | 1/2009 | DePasquale | G06Q 10/02 |
| 2009/0300641 A1 * | 12/2009 | Friedman | G06F 11/3664 718/104 |
| 2010/0217840 A1 * | 8/2010 | Dehaan | G06F 8/60 709/220 |
| 2011/0126168 A1 * | 5/2011 | Ilyayev | G06F 9/5072 717/103 |
| 2011/0153836 A1 * | 6/2011 | Ireland | G06F 17/30525 709/227 |
| 2011/0184993 A1 * | 7/2011 | Chawla | G06F 9/45533 707/802 |
| 2011/0225417 A1 * | 9/2011 | Maharajh | G06F 21/10 713/150 |
| 2012/0032945 A1 * | 2/2012 | Dare | G06F 3/0481 345/418 |
| 2012/0036220 A1 * | 2/2012 | Dare | G06F 8/61 709/217 |
| 2012/0054754 A1 * | 3/2012 | Teichmann | H04L 41/082 718/102 |
| 2012/0110174 A1 * | 5/2012 | Wootton | G06F 21/564 709/224 |
| 2012/0158556 A1 * | 6/2012 | Said | G06Q 40/12 705/30 |
| 2012/0215898 A1 * | 8/2012 | Shah | H04L 65/1069 709/223 |
| 2012/0317565 A1 * | 12/2012 | Carrara | G06F 8/61 717/178 |
| 2013/0014080 A1 * | 1/2013 | Brunswig | G06F 9/4443 717/102 |
| 2013/0019237 A1 * | 1/2013 | Pardehpoosh | G06Q 30/0609 717/171 |
| 2013/0218978 A1 * | 8/2013 | Weinstein | H04L 65/403 709/205 |
| 2013/0219280 A1 * | 8/2013 | Weinstein | H04L 65/1069 715/736 |

(56) References Cited

U.S. PATENT DOCUMENTS

| | | | |
|---|---|---|---|
| 2013/0283298 A1* | 10/2013 | Ali | G06F 9/5077 |
| | | | 719/319 |
| 2013/0325927 A1* | 12/2013 | Corbett | G06F 17/30442 |
| | | | 709/203 |
| 2014/0019480 A1* | 1/2014 | Rychikhin | G06F 17/30864 |
| | | | 707/770 |
| 2014/0040791 A1* | 2/2014 | Kim | G06F 3/048 |
| | | | 715/762 |
| 2014/0040861 A1* | 2/2014 | Kim | G06F 8/70 |
| | | | 717/120 |
| 2014/0136712 A1* | 5/2014 | Kim | H04L 47/70 |
| | | | 709/226 |
| 2015/0127628 A1* | 5/2015 | Rathod | H04W 4/206 |
| | | | 707/710 |
| 2015/0199197 A1* | 7/2015 | Maes | G06F 8/71 |
| | | | 717/122 |
| 2017/0286516 A1* | 10/2017 | Horowitz | G06F 17/30371 |

* cited by examiner

FACILITATING DYNAMIC GENERATION AND CUSTOMIZATION OF SOFTWARE APPLICATIONS AT CLIENT COMPUTING DEVICES USING SERVER METADATA IN AN ON-DEMAND SERVICES ENVIRONMENT

CLAIM OF PRIORITY

This application claims priority to and the benefit of U.S. Provisional Patent Application No. 61/670,702 entitled "System and Method for Generating a Mobile Application with Server Metadata" by Yuri Rychikhin, filed Jul. 12, 2012, and the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating dynamic generation and customization of software applications at client computing devices using server metadata in an on-demand services environment.

BACKGROUND

Even with increasing client-based software applications and tools, there remains an interaction and access gap between client computing devices being used by users (e.g., end-users, software developers, etc.) and resources (e.g., metadata) generally available at server computer devices. For example, in conventional systems, users have to go through a cumbersome process of manually sorting through various supporting and development documents to have access to metadata (such as structural metadata to describe whole or part of data structures, such as tables, rows, columns, indexes, etc., descriptive metadata to provide additional descriptive information relating to data structures, such as who created the table and when, etc.) relating to data being used by the users to perform various tasks. Such exercises require a great deal of manual work and are time-consuming, resource-consuming, and error-prone. To avoid this manual work, in some cases, the metadata is guessed and in other cases, it is partially or completely ignored.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
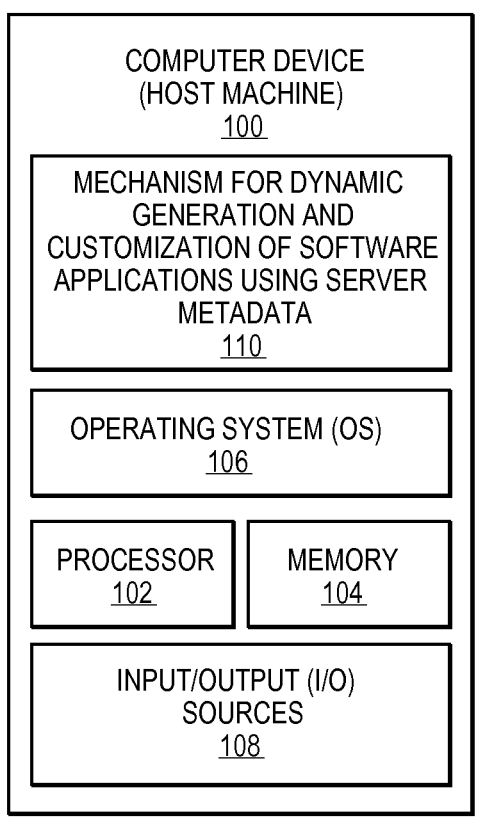
FIG. 1 illustrates a computing device employing a mechanism for dynamic generation and customization of software applications using server metadata according to one embodiment.

In accordance with embodiments, there are provided mechanisms and methods for facilitating dynamic generation and customization of software applications using server metadata in an on-demand services environment in a multi-tenant environment according to one embodiment. In one embodiment and by way of example, a method includes receiving, at a server computing device, a request to access server metadata relating to object types, where the server metadata is stored at a database coupled to the server computing device. The method may further include providing access to the server metadata, and facilitating, using the server metadata, dynamic generation of a mobile software application at a client computing device including a mobile computing device. The dynamic generation of the mobile software application is performed automatically, in runtime, and locally at the client computing device in response to the request.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating dynamic generation and customization of software applications using server metadata in an on-demand services environment in a multi-tenant environment according to one embodiment. In one embodiment and by way of example, a method includes receiving, at a server computing device, a request to access server metadata relating to object types, where the server metadata is stored at a database coupled to the server computing device. The method may further include providing access to the server metadata, and facilitating, using the server metadata, dynamic generation of a mobile software application at a client computing device including a mobile computing device. The dynamic generation of the mobile software application is performed automatically, in runtime, and locally at the client computing device in response to the request.

Embodiments provide for facilitating access to server metadata and generating and updating mobile applications at client computing devices (e.g., mobile computing devices) using the server metadata providing by a server computing device. For example, online database service providers, such as Salesforce.com®, Inc., generally store server-based metadata relating to every object at their databases maintained by server computing devices. In one embodiment, a user (e.g., an end-user, a software developer/programmer, a system administrator, etc.) may access the available metadata via a user interface at a client computing device (e.g., mobile computing device, such as smartphone, tablet computer, etc.) and then use the available and accessible metadata to dynamically, and in runtime, generate, execute, and customize various mobile software applications at the mobile computing device without having to ignore, guess, mimic, recreate, or manually research the server metadata.

This and other similar examples may be referenced throughout the document for brevity, clarify, and ease of understanding, but it is contemplated that embodiments are not merely limited to metadata or simply generating mobile applications on mobile devices and that that other forms of data at servers in a multi-tenant database system may also be accessed or leveraged to be used for other purposes, such as generating default client views, client validation rules, client application logic, etc.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a computing device 100 employing a mechanism for dynamic generation and customization of software applications using server metadata 110 according to one embodiment. In one embodiment, computing device 100 serves as a host machine employing mechanism for dynamic generation of software applications using server metadata ("metadata application mechanism") 110 for facilitating access to server metadata and dynamic generation and customization of software applications at computing devices in a multi-tiered, multi-tenant, on-demand services environment. As aforementioned, the term "user" may refer to a system user, such as, but not limited to, a software/application developer, a system administrator, a database administrator, an information technology professional, a program manager, product manager, etc., or an end-user, such as a representative of a customer (e.g., an organization, a business, a company, a corporation, a non-profit entity, an institution, an agency, etc.). The customer may be a customer or client of the provider (e.g., Salesforce.com) of metadata application mechanism 110. It is to be noted that terms like "user", "customer", "organization", "tenant", "business", "company", etc., may be used interchangeably throughout this document.

It is to be noted that certain references to data, metadata, computing devices (mobile computing devices, such as smartphones, etc.), software development applications and tools (e.g., Sprint Planner®, MS Project®, Chatter® Groups, etc.), etc., discussed in this document are merely used as examples for brevity, clarity, ease of understanding, and not to obscure metadata application mechanism 110; however it is contemplated that embodiments are not limited to any particular data, metadata, computing devices, software development applications and tools. For example, embodiments are applicable to any number and type of applications and processes, such as customer relationship management (CRM)-based processes and applications (e.g., sales, accounting, customer support, marketing, technical support, etc.), etc.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research In Motion® (RIM) Limited, now serving and trading as BlackBerry®, etc.), handheld computing devices, personal digital assistants (PDAs), etc., tablet computers (e.g., iPad® by Apple®, Galaxy® by Samsung®, etc.), laptop computers (e.g., notebooks, netbooks, Ultrabook™, etc.), e-readers (e.g., Kindle® by Amazon.com®, Nook® by Barnes and Nobles®, etc.), Global Positioning System (GPS)-based navigation systems, cable setup boxes, etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "application", "software application", "program", "software program", "package", and "software package" may be used interchangeably throughout this document. Moreover, terms like "job", "input", "request" and "message" may be used interchangeably throughout this document.

Figure 2:
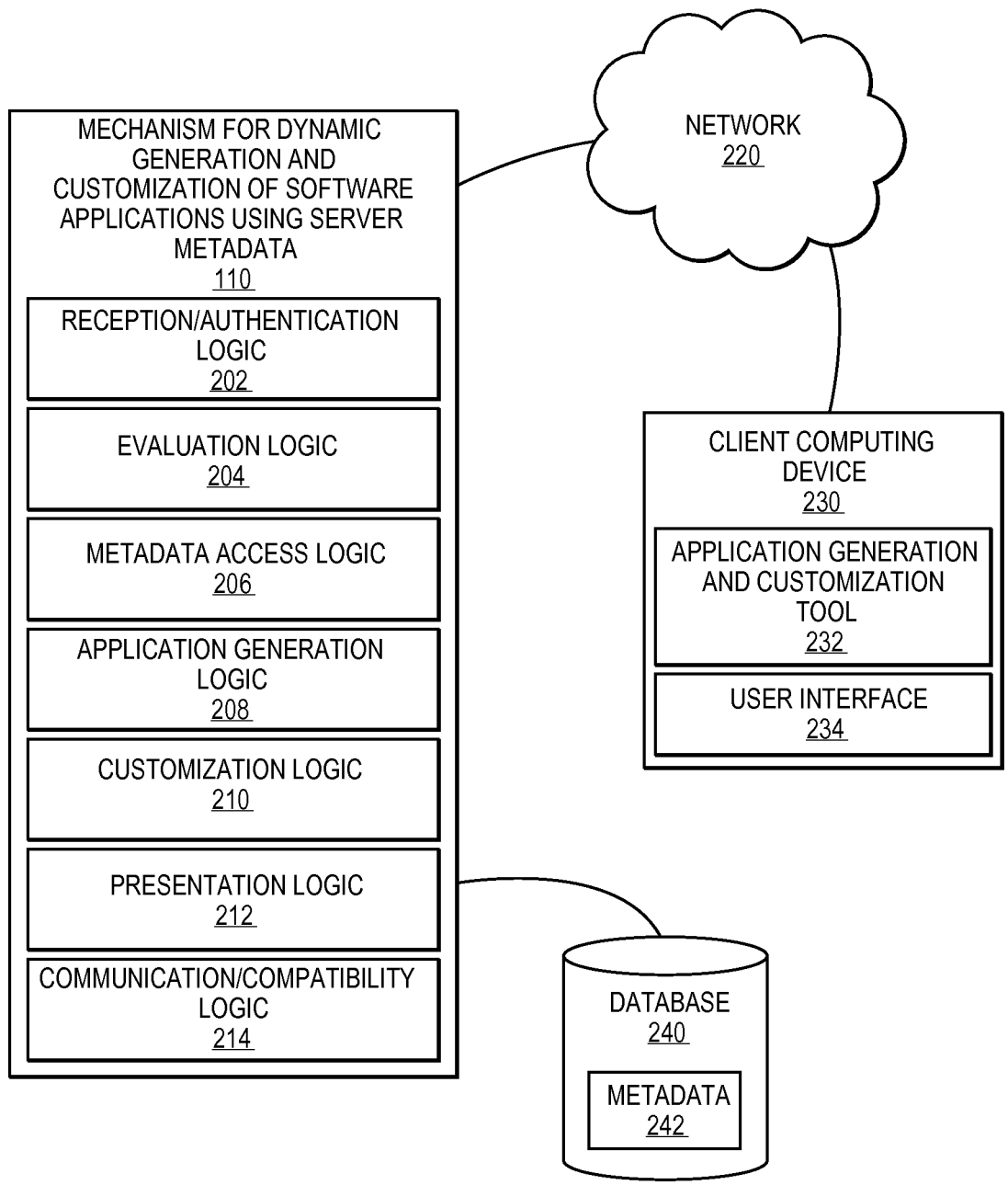
FIG. 2 illustrates a mechanism for dynamic generation and customization of software applications using server metadata according to one embodiment.

FIG. 2 illustrates a mechanism for dynamic generation and customization of software applications using server metadata 110 according to one embodiment. In one embodiment, metadata application mechanism 110 includes a number of components, such as reception/authentication logic 202, evaluation logic 204, metadata access logic 206, application generation logic 208, customization logic 210, presentation logic 212, and communication/compatibility logic 214. Throughout this document, "logic" may be interchangeably referred to as "component" or "module" and may include, by way of example, software, hardware, and/or any combination of software and hardware, such as firmware.

In one embodiment, reception/authentication logic 202 may receive a request from a user via client computing device (e.g., mobile computing device) 230 for accessing metadata 242 and subsequently generating a mobile software application using an application generation and customization tool 232 at client device 230. It is contemplated that the request may not be limited to simply accessing metadata and/or generating a mobile application, but that it may include or refer to any number and type of requests, such as to access server metadata 242, use server metadata 242 to generate one or more mobile software applications, customize one or more mobile software applications, customize data presentation formats, and/or the like. In addition to receiving the request, reception/authentication logic 202 may also perform various authentication tasks, such as authenticating the user using user profile data (e.g., user-identification (userID), password, name, organization identity, unique key, etc.), client computing device 230 (e.g., public key, private key, device registration profile, etc.), the request and its content (e.g., verifying the nature and content of the request, etc.), and so forth.

Upon receiving the request and performing the authentication processes, reception/authentication logic 202 may forward the request to evaluation logic 202 for evaluation of the request. In one embodiment, evaluation logic 204 may review and parse the contents of the request so that the request may be properly evaluated and subsequently, any appropriate steps may be taken to perform the request. In some cases, the request may be rejected by evaluation logic 204 or even earlier by reception/authentication logic 202 for any number and type of reasons, such as for being incomplete, incorrect in its format, improper in terms of its content or expectations, unauthenticated, etc.

Upon evaluation of the contents of the request, the request may then be forwarded on to metadata access logic 206 so that the requested server metadata 242 may be accessed. The term "metadata" generally refers to data about data and may include, but is not limited to, structural metadata, descriptive metadata, technical metadata, definition or business metadata, derivative metadata, or the like. Structural data refers to structure, design, and specification of data structures and is often referred to as "data about the containers of data" that is used to describe computer data structures, such as tables, columns, rows, formulae, and indexes, etc. Descriptive metadata refers to descriptive data that provides additional information about data structures and can be used to search or locate certain objects within such data structures. Descriptive metadata may include case or file titles, author or user names, department names, timestamps, subjects or small descriptions, keywords, etc. Technical metadata refers to data about processes, tools sets, repositories, runtimes, performance averages, etc. Technical metadata may also include administrative metadata referring to certain technical information, such as file type. Definition metadata, also referenced as business metadata, refers to data about technical metadata, such as definition of data, definition of elements, business metrics, business terminology, business process flow, etc. Definition metadata may also include presentation of business data through various visual representations, such as graphs, charts, colors, shapes, etc. Derivative metadata refers to metadata derived from a set of data or metadata through processes or formulae (e.g. financial formulae), such as derivative financial datasets, derivative pricing scenarios, derivative commodities prices, derivative historical time series, etc.

The request may have been placed by a software developer at a company/organization (e.g., a customer of Salesforce.com) seeking to know certain metadata about a table (e.g., a table representing the company's quarterly sales). The software developer may be interested in structural metadata of metadata 242, such as number of rows or columns of the table, length of fields, shape of the table, number of characters in each name, etc. As will be further described with regard to FIG. 4, this metadata 242 may then be used by the software developer to generate a mobile software application to be used by mobile computing device end-users (e.g., sales director, accounts manager, etc.) at the company so that this table and other such tables and relevant documents may be easily accessed, reviewed, edited, etc., by those using mobile computing devices, such as client computing device 230.

Similarly, the request may have been placed by an end-user (e.g., sales director at the company) seeking to know a different type of metadata 242 (such as descriptive metadata as opposed to structural metadata) about the same table, such as name of the person who generated or last edited the table, time of table generation, time of last edit, location from where the table was generated or last edited, etc. This metadata 242 may then be used by the end-user to customize the way the data (e.g., table) is presented using the mobile software application, generated by the system administrator, and user interface 234. Using the table as an example, this customization of data presentation may include customizing the presentation of the table, serving as definition metadata, such as color, size, shape, etc., and its conversation into graphical presentation, such as pie chart, bar chart, line chart, etc.

In one embodiment, metadata access logic 206 facilitates access to metadata 242 stored at database 240. For example, the user may access any of metadata 242 already available and stored at database 240 via user interface 234 (e.g., a website, a dedicated user interface, etc.) at client computing device 230. In one embodiment, application generation logic 208 facilitates dynamic generation of mobile software application to be accessed and used locally at client computing device 230. For example, once having access to the necessary metadata 242, the software developer may use application generation and customization tool 232 to trigger application generation logic 208 to facilitate dynamic generation of the software application to be located and used at computing device 230. Similarly, in one embodiment, the use of application generation and customization tool 232 triggers customization logic 210 to facilitate dynamic customization of the newly-generated software application or any data to be presented at computing device 230.

This dynamic generation includes automatic and runtime generation of the mobile software application at client computing device 230 in response to the received user request. In one embodiment, this dynamic generation further includes automatically, in runtime, generating shadow components that are similar to or the same as one or more components, such as components 208-214, of metadata application mechanism 110, at client computing device 230 such that the shadow components may be accessed and used locally at client computing device 230. In one embodiment, a mobile software application may be automatically and dynamically generated at client computing device 230 in response to the user request and without any other interference from the user. In another embodiment, the mobile software application generation may be triggered in response to the user using application generation and customization tool 232 for a more controlled generation of the mobile software application.

In one embodiment, once the mobile software application is generated, it may be dynamically updated or customized in response to a user request or automatically in response to any changes in the relevant metadata of metadata 242. In one embodiment, the dynamic update includes dynamic customization that is performed automatically and in runtime at client computing device 230 each time a change in metadata 242 is detected by metadata access logic 206. In another embodiment, the dynamic update or customization may be performed, via application generation and customization tool 232, as desired or necessitated by the user or the organization/company represented by the user.

In one embodiment, presentation logic 212 may be used for facilitating dynamic presentation of results for visualization at client computing device 230 via user interface 234, such as the customized presentation of the newly-generated mobile software application, customized presentation of data (e.g., table), customized presentation of metadata 242 (e.g., time of table generation, etc.), etc. In other words, once the generation and/or customization has been performed, presentation logic 212, via communication/compatibility logic 214, may facilitate presentation of various information (e.g., mobile software application, icons, tables, graphs, charts, documents, etc.) at client computing device 230 where, for example, the icons and/or text phrases representing various features of mobile applications and data presentation are visualized for or displayed to the user based on generation and/or customization processes as facilitated by application generation logic 208 and customization logic 210. In one embodiment, presentation logic 224 may be used to facilitate implementation and workings of user interface 234 at client computing device 230. The presentation may be performed in any number and type of presentation forms, such as Graphical User Interface (GUI)-based, text-based, graphical/chart-based, animation-based, etc.

In one embodiment, any amount and type of metadata 242 stored at database 240 may be received or extracted, via reception/authentication logic 202, from various internal and external log sources (e.g., log files) that are tapped to retrieve or receive any amount and type of metadata 242 regarding various data items/objects (e.g., customer data, sales data, product data, project data, geographic location data, employment data, past or current market data, future market opportunities data, competitor or competition data, user data, usage activities, etc.) that are continuously or periodically recorded in log files, such as Salesforce.com internal application logs, application usage logs from external systems, etc., and then maintained and stored at database 240. Any amount and type of metadata 242 stored at database 240 may be accessed by the user through access logic 206 in concert with user interface 234 at client computing device 230. This metadata 242 may also be prepared for and used by application generation logic 208 and customization logic 210 for dynamic generation and dynamic customization, respectively, of mobile software applications and data/metadata presentation at client computing device 230 over network 220 (e.g., cloud network).

In one embodiment, metadata 242 may be used to generate and customize one or more mobile software applications for performing any number and type of tasks at the client-side via client computing device 230. Such tasks may include, but are not limited to, generating and/or customizing mobile software applications, customizing data and/or metadata presentations, communicating with other computing devices over network 220, re-creating server data types on the client side, mapping server responses to client data types, providing any number and type of data contents, performing offline editing within content providers, synchronizing for offline editing, generating server commands, performing querying and updating and editing, generating or customizing default client views (e.g., customizing data presentation, etc.), generating client validation rules (e.g., required fields, optional fields, particular formats, etc.), generating client application logic (e.g., creating new data, generating old data, generating data logic, etc.), testing various cases for other usages and tasks. Further, in one embodiment, the aforementioned tasks may be performed using any number and type of platforms and languages, such as Salesforce Object Query Language (SOQL™) by Salesforce.com. For example, SOQL, which refers to an object query language for querying data using the Force.com® platform, may be used for communications purposes (e.g., querying, updating, customizing, editing, etc.).

In one embodiment, metadata application mechanism 110 dynamically generates the necessary source code for a mobile client-based software application to be employed at client computing device 230 (e.g., mobile computing device), where the mobile software application may be employed and used locally at client computing device 230 and can be modified or customized using application generation and customization tool 232 at client computing device 230. Further, in one embodiment, metadata application mechanism 110 facilitates, in runtime, automatic and dynamic metadata consumption and client adaptation of the mobile software application at client computing device 230, where the mobile software application may automatically request metadata from metadata application mechanism 110 at cloud server computing device, such as host computing device 100 of FIG. 1, to automatically and dynamically build and/or update, in runtime, the mobile software application. In one embodiment, the mobile software application may employ any number and type of shadow components similar or corresponding to any number and type of server-based components, such as components 208, 210, 212, 214, of metadata application mechanism 110 as well as other client-based components, such as application generation and customization tool 232 and user interface 234, for performing various tasks locally at client computing device 230. Using this technique, for example, a generic and malleable mobile software application may be distributed to any number and type of organizations/customers, where after the metadata is received and processed, the mobile software application may automatically and dynamically, and in runtime, update or customize itself for each organization/customer, such as to stay compatible with the preferences, including needs and requirements, of each corresponding organization/customer.

Communication/compatibility logic 214 may facilitate the ability to dynamically communicate and stay configured with any number and type of software/application developing tools, models, data processing servers, database platforms and architectures, programming languages and their corresponding platforms, etc. Communication/compatibility logic 216 further facilitates the ability to dynamically communicate and stay configured with various computing devices (e.g., mobile computing devices (such as various types of smartphones, tablet computers, laptop, etc.), networks (e.g., Internet, intranet, cloud-computing network, etc.), websites (e.g., social networking websites, such as Facebook®, LinkedIn®, Google+®, Twitter®, etc.), and the like, while ensuring compatibility with changing technologies, parameters, protocols, standards, etc.

It is contemplated that any number and type of components may be added to and/or removed from metadata application mechanism 110 to facilitate various embodiments including adding, removing, and/or enhancing certain features. For brevity, clarity, ease of understanding, and not to obscure metadata application mechanism 110, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

Figure 3:
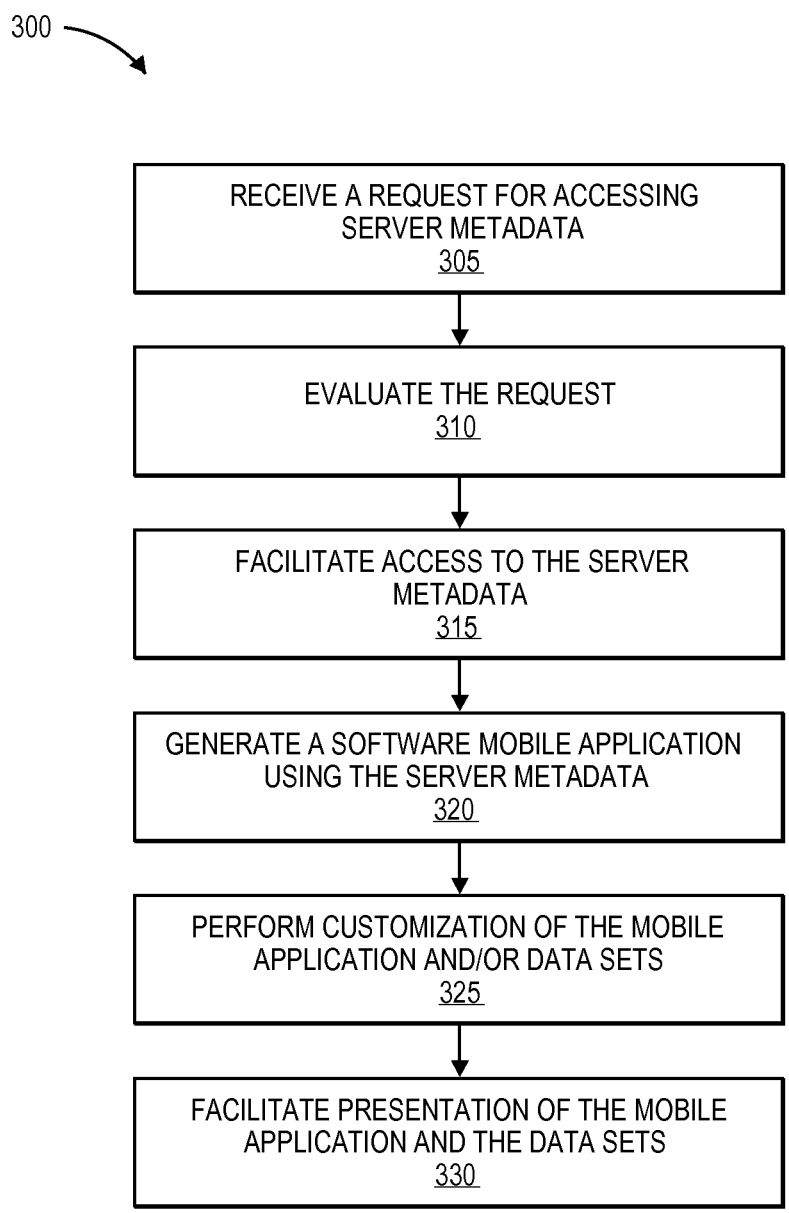
FIG. 3 illustrates a method for facilitating dynamic generation and customization of software applications using server metadata in an on-demand services environment in a multi-tenant environment according to one embodiment.

FIG. 3 illustrates a method for facilitating dynamic generation of software applications using server metadata in an on-demand services environment in a multi-tenant environment according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by mechanism for dynamic generation of software applications using server metadata 110 of FIG. 1.

Method 300 begins at 305 with receiving a request for accessing metadata stored at a database in communication with a server computing device hosting metadata application mechanism 110 of FIG. 1. The request is placed by a user (e.g., software developer) using a client computing device (e.g., mobile computing device) that is communication with the server computing device over a network. At block 310, the request and its contents are evaluated to determine whether the request can be accepted and what processes need to be performed to fulfill the request. For example, the evaluation process may analyze the contents of the request to determine the amount and type of metadata that the user is requesting to access and whether the requested metadata is available at the database.

At block 315, upon evaluation of the request, access to the requested metadata is facilitated such that the user may access the metadata via a user interface at the client computing device. At block 320, a mobile software application may be dynamically generated, in runtime, automatically in response to the user request or when triggered by the user's use of an application development tool at client computing device, such as application generation and customization tool 232 of FIG. 2. The mobile software application may be generated to be locally stored and used at the client computing device for performing any number of tasks using the accessed metadata. These tasks may include, but are not limited to, generating and/or customizing mobile software applications, customizing data presentations, communicating with other computing devices, re-creating server data types on the client side, mapping server data types to client data types, providing any number and type of data contents, performing offline editing within content providers, synchronizing for offline editing, generating server commands, performing querying and updating and editing, generating or customizing default client views (e.g., customizing data presentation, etc.), generating client validation rules (e.g., required fields, optional fields, particular formats, etc.), generating client application logic (e.g., creating new data, generating old data, generating data logic, etc.), generating automated tests within the client application, testing various cases for other usages and tasks, etc.

Once the mobile software application is generated, at block 325, dynamic customization may be performed, in runtime, automatically upon detecting a change in the relevant server metadata at the database or in response to the user choosing to customize the newly-generated mobile application or any other existing mobile applications or any other number and type of data sets for presentation using application and generation customization tool 232 of FIG. 2. At block 330, the mobile software application and any other data sets are presented at the client computing device, via user interface 234 of FIG. 2, to be used by the user to perform any of the aforementioned tasks.

Figure 4:
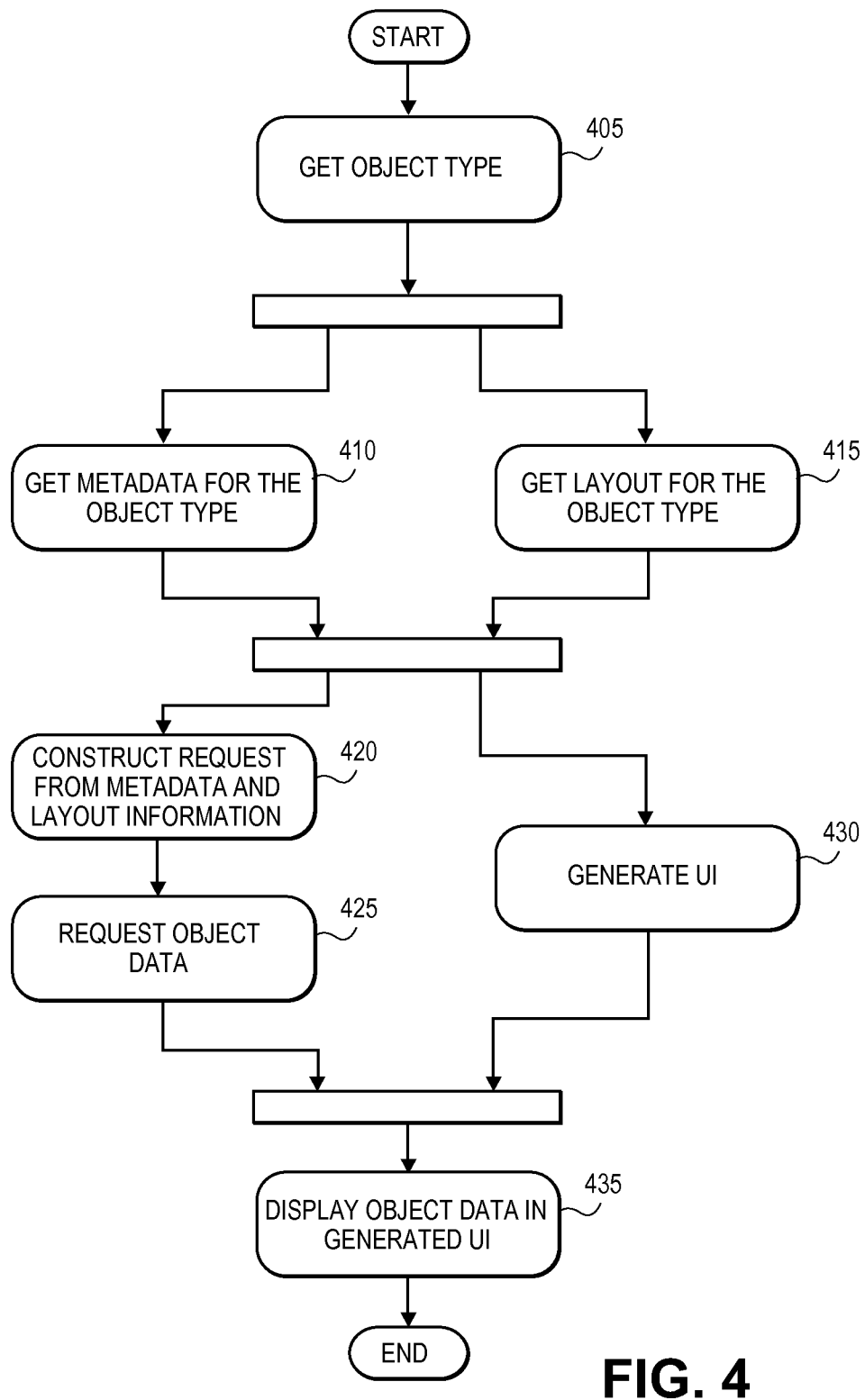
FIG. 4 illustrates a method for facilitating dynamic generation of software applications using server metadata in an on-demand services environment in a multi-tenant environment according to one embodiment.

FIG. 4 illustrates a method for facilitating dynamic generation of software applications using server metadata in an on-demand services environment in a multi-tenant environment according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by mechanism for dynamic generation of software applications using server metadata 110 of FIG. 1.

Method 400 begins at 405 with identifying and obtaining an object type for which metadata is requested by a user via a user interface at the client computing device where the metadata is stored at a database in communication with a server computing device hosting metadata application mechanism 110 of FIG. 1. The request for the metadata is placed by the user (e.g., software developer) using the client computing device (e.g., mobile computing device) that is communication with the server computing device over a network. At block 410, the requested metadata relating to the object type is obtained as well as the layout of the object type is obtained at block 415.

In one embodiment, at block 420, the metadata for the object type and the layout of the object type are used to construct a request which is then used to request the object data, at block 425, to generate a mobile software application to be used at the client computing device. Similarly, at block 430, the metadata for the object type and the layout of the object type are used to generate a user interface that is then used to display the object data, including the newly-generated mobile application and any relevant data, at block 435.

Figure 5:
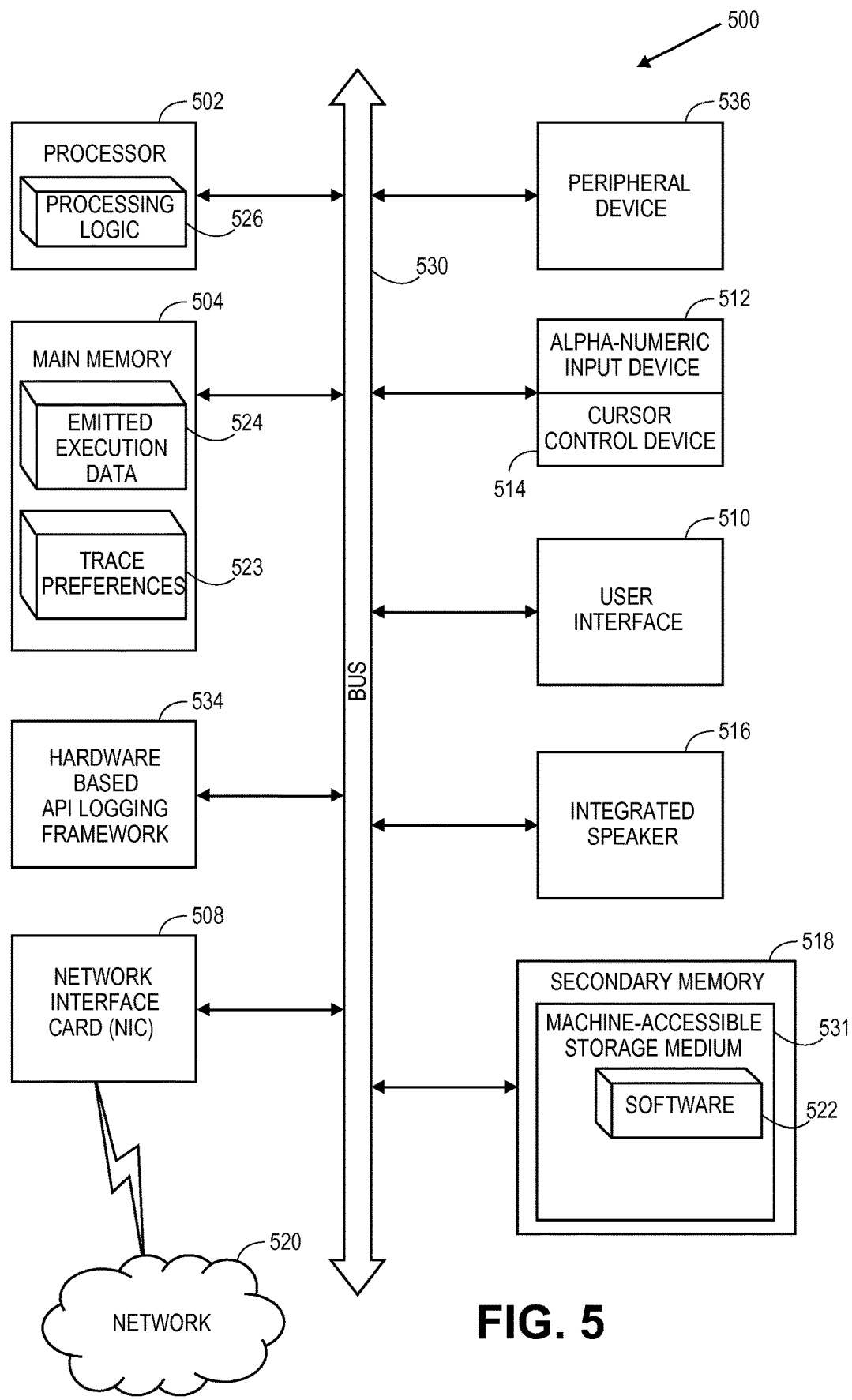
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 and computing device 230 of FIG. 1 and FIG. 2, respectively. In alternative embodiments, the machine may be connected (e.g., networked) to other machines in a network (such as host machine 100 of FIG. 1 connected with client machine 230 over network 220 of FIG. 2), such as a cloud-based network, a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of metadata application mechanism 110 as described with reference to FIG. 1 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of metadata application mechanism 110 as described with reference to FIG. 1 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
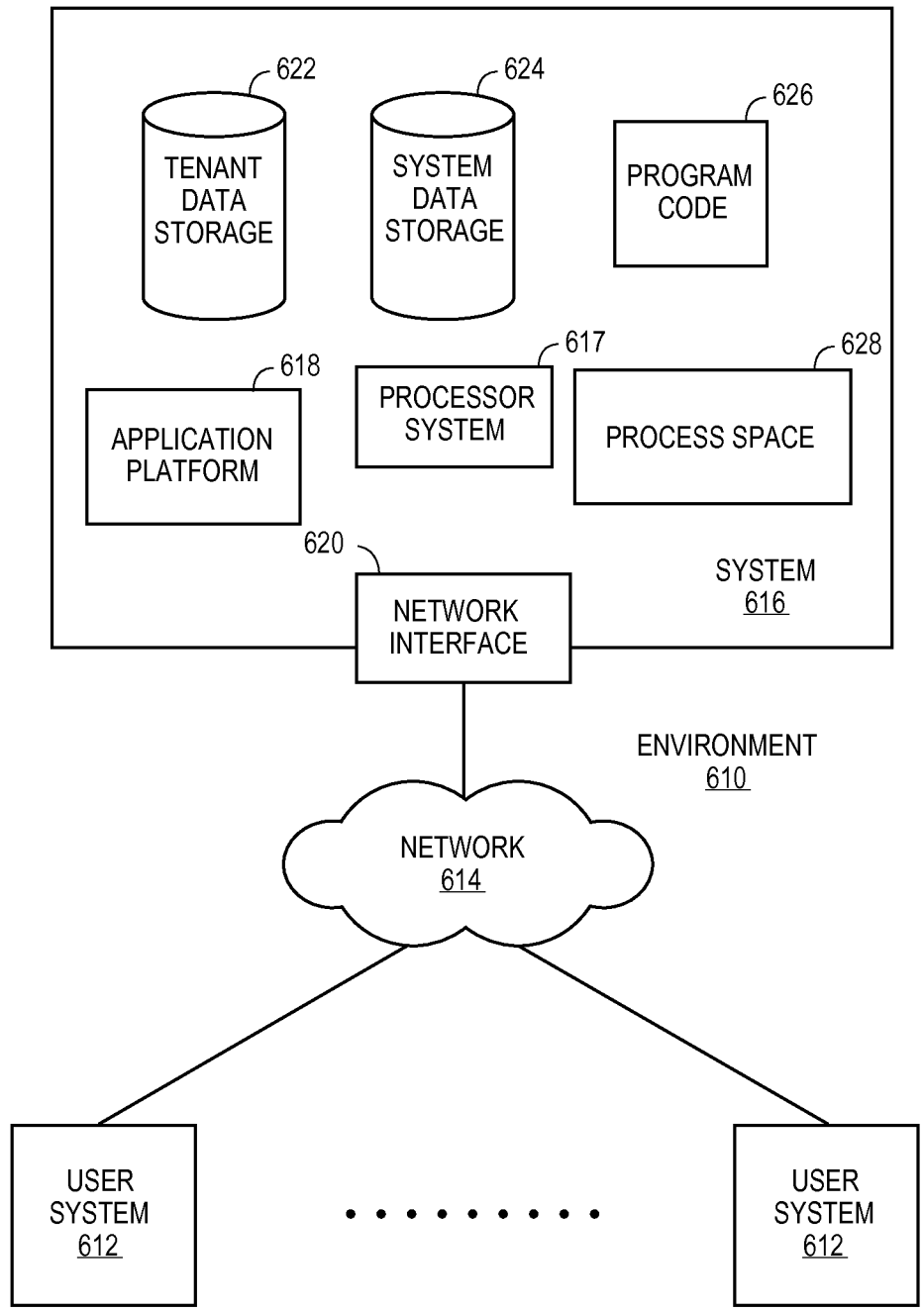
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
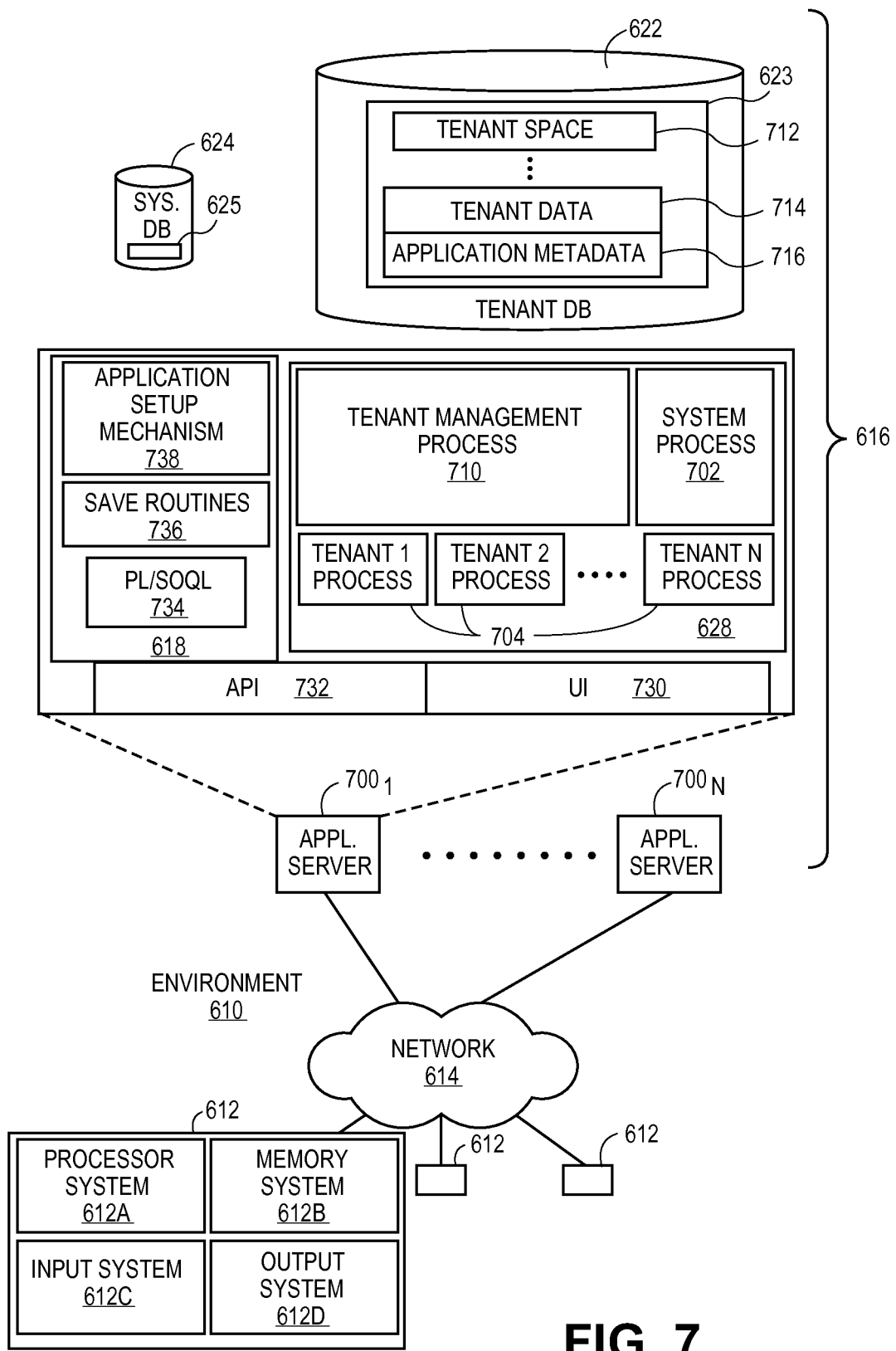
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A computer-implemented method comprising:
receiving, by a server computing device, a request from a client computing device to access descriptive server metadata specific to a data object of a data structure to perform one or more tasks including customizing a software application at the client computing device, wherein the server metadata is stored at a database coupled to the server computing device, and wherein the client computing device includes a mobile computing device offering a user interface for placing the request with the server computing device over a cloud network;
allowing, by the server computing device, the client computing device to access the requested server metadata directly from the database, wherein the server metadata is customized for the client computing device such that the customized server metadata include one or more pre-coded routines associated with the one or more tasks; and
facilitating, by the server computing device, performance of the one or more tasks at the client computing device, using the data object and the customized server metadata having the one or more pre-coded routines, wherein the one or more pre-coded routines are invoked, as facilitated by a metadata entity, to perform the one or more tasks, wherein the metadata entity dynamically updates the customized server metadata based on changes in the one or more tasks the one or more pre-coded routines, wherein the one or more tasks include dynamically generating one or more mobile applications at the client computing device through access to the customized server metadata based on the one or more pre-coded routines.

2. The method of claim 1, wherein the tasks further comprise dynamically updating, in runtime, the software application from a first version to a second version, locally, at the client computing device, wherein providing access includes mapping one or more portions of the server metadata to one or more sets of client data residing locally at the client computing device.

3. The method of claim 1, wherein customizing a software application comprises customizing based on preferences of a user having access to the client computing device, wherein the user serves as a representative of a tenant of a plurality of tenants in a multi-tenant environment, wherein the dynamic customization maintains compatibility between the software application and the preferences of the user.

4. The method of claim 1, further comprising offering access to a development tool from the client computing device such that the one or more tasks are performed locally at the client computing device using the development tool without employing local tools.

5. The method of claim 1, wherein the access is further allowed through the metadata entity, wherein the metadata entity to update, in runtime, the server metadata by dynamically accessing compiled metadata at the database that is communicatively part of the cloud network, wherein the compiled metadata includes routines for execution by subscribers associated with the tenant, wherein the routines offer pre-coded programs to provide programming language style interface extensions to application programming interfaces (APIs), wherein a subscriber is to invoke and execute a portion of the server metadata in a virtual machine associated with the software application.

6. The method of claim 1, further comprising dynamically customizing the software application by altering a metadata setup of the software application.

7. The method of claim 1, further comprising:
receiving through the cloud network by the server computing a device, a request from a client computing device to access structural server metadata relating to the data object of the data structure at the client computing device, to perform generating the software application using the requested structural server metadata; and providing through the cloud network by the server computing device, access to the requested structural server metadata to the client computing device through the cloud network in response to the request.

8. The method of claim 1, wherein providing access includes mapping one or more portions of the server metadata to one or more sets of client data residing locally at the client computing device.

9. A system comprising:
a server computing device having a memory to store instructions, and a processing device to execute the instructions to facilitate a mechanism to perform operations comprising
receiving a request from a client computing device to access descriptive server metadata specific to a data object of a data structure to perform one or more tasks including customizing a software application at the client computing device, wherein the server metadata is stored at a database coupled to the server computing device, and wherein the client computing device includes a mobile computing device offering a user interface for placing the request with the server computing device over a cloud network;
allowing the client computing device to access the requested server metadata directly from the database, wherein the server metadata is customized for the client computing device such that the customized server metadata include one or more pre-coded routines associated with the one or more tasks; and
facilitating performance of the one or more tasks at the client computing device, using the data object and the customized server metadata having the one or more pre-coded routines, wherein the one or more pre-coded routines are invoked, as facilitated by a metadata entity, to perform the one or more tasks, wherein the metadata entity dynamically updates the customized server metadata based on changes in the one or more tasks the one or more pre-coded routines, wherein the one or more tasks include dynamically generating one or more mobile applications at the client computing device through access to the customized server metadata based on the one or more pre-coded routines.

10. The system of claim 9, wherein the operations further comprise dynamically updating, in runtime, the software application from a first version to a second version, locally, at the client computing device, wherein providing access includes mapping one or more portions of the server metadata to one or more sets of client data residing locally at the client computing device.

11. The system of claim 10, wherein the dynamic updating is performed based on preferences of a user having access to the client computing device, wherein the user serves as a representative of a tenant of a plurality of tenants in a multi-tenant environment, wherein the dynamic updating is to maintain compatibility between the software application and the preferences of the user.

12. The system of claim 9, wherein the operations further comprise offering access to a development tool from the client computing device such that the tasks are performed locally at the client computing device using the development tool.

13. The system of claim 9, wherein the access is further allowed through the metadata entity, wherein the metadata entity to update, in runtime, the server metadata by dynamically accessing compiled metadata at the database that is communicatively part of the cloud network, wherein the compiled metadata includes routines for execution by subscribers associated with the tenant, wherein the routines offer pre-coded programs to provide programming language style interface extensions to application programming interfaces (APIs), wherein a subscriber to invoke and execute a portion of the server metadata in a virtual machine associated with the software application.

14. The system of claim 9, wherein the operations further comprise dynamically customizing the software application by altering a metadata setup of the software application.

15. A machine-readable medium having stored thereon instructions which, when executed by a processor, cause the processor to perform one or more operations comprising:
receiving a request from a client computing device to access descriptive server metadata specific to a data object of a data structure to perform one or more tasks including customizing a software application at the client computing device, wherein the server metadata is stored at a database coupled to the server computing device, and wherein the client computing device includes a mobile computing device offering a user interface for placing the request with the server computing device over a cloud network;
allowing the client computing device to access the requested server metadata directly from the database, wherein the server metadata is customized for the client computing device such that the customized server metadata include one or more pre-coded routines associated with the one or more tasks; and
facilitating performance of the one or more tasks at the client computing device using the data object and the customized server metadata having the one or more pre-coded routines, wherein the one or more pre-coded routines are invoked, as facilitated by a metadata entity, to perform the one or more tasks, wherein the metadata entity dynamically updates the customized server metadata based on changes in the one or more tasks the one or more pre-coded routines, wherein the one or more tasks include dynamically generating one or more mobile applications at the client computing device through access to the customized server metadata based on the one or more pre-coded routines.

16. The machine-readable medium of claim 15, wherein the operations further comprise dynamically updating, in runtime, the software application from a first version to a second version, locally, at the client computing device, wherein providing access includes mapping one or more portions of the server metadata to one or more sets of client data residing locally at the client computing device.

17. The machine-readable medium of claim 16, wherein the dynamic updating is performed based on preferences of a user having access to the client computing device, wherein the user serves as a representative of a tenant of a plurality of tenants in a multi-tenant environment, the dynamic customization to maintain compatibility between the software application and the preferences of the user.

18. The machine-readable medium of claim 15, wherein the operations further comprise offering access to a development tool from the client computing device such that the one or more tasks are performed without seeking development services from one or more software developers.

19. The machine-readable medium of claim 15, wherein the access is further allowed through the metadata entity, wherein the metadata entity to update, in runtime, the server metadata by dynamically accessing compiled metadata at the database that is communicatively part of the cloud network, wherein the compiled metadata includes routines for execution by subscribers associated with the tenant, the routines to offer pre-coded programs to provide programming language style interface extensions to application programming interfaces (APIs), a subscriber to invoke and execute portions of the server metadata in one or more virtual machines associated with the software application.

20. The machine-readable medium of claim 15, the operations further comprising dynamically customizing the software by altering a metadata setup of the software application, wherein altering includes at least one of adding, in runtime, one or more new metadata items to the metadata setup or modifying or removing, in runtime, one or more existing metadata items to the metadata setup.

\* \* \* \* \*